United States Patent
Nanba

(10) Patent No.: US 7,791,637 B2
(45) Date of Patent: Sep. 7, 2010

(54) DATA TRANSMISSION SYSTEM

(75) Inventor: Yousuke Nanba, Daito (JP)

(73) Assignee: Funai Electric Co., Ltd., Daito-shi (JP)

(*) Notice: Subject to any disclaimer, the term of this patent is extended or adjusted under 35 U.S.C. 154(b) by 1202 days.

(21) Appl. No.: 11/388,024

(22) Filed: Mar. 24, 2006

(65) Prior Publication Data

US 2007/0037572 A1     Feb. 15, 2007

(30) Foreign Application Priority Data

Mar. 25, 2005   (JP) ............................. 2005-087799

(51) Int. Cl.
*H04N 7/14* (2006.01)
(52) U.S. Cl. ................................. 348/14.01; 348/14.02
(58) Field of Classification Search .............. 379/90.01, 379/93.01, 93.17, 93.33; 709/233–235; 348/14.02, 348/14.01, 14.13, 14.11
See application file for complete search history.

(56) References Cited

U.S. PATENT DOCUMENTS

| | | | | |
|---|---|---|---|---|
| 2003/0067872 A1* | 4/2003 | Harrell et al. | ................ | 370/229 |
| 2004/0172478 A1* | 9/2004 | Jacobs et al. | ................ | 709/233 |

FOREIGN PATENT DOCUMENTS

| JP | 2001-292381 A | 10/2001 |
|---|---|---|
| JP | 2002-198975 A | 7/2002 |
| JP | 2003-273879 A | 9/2003 |
| JP | 2004-266502 A | 9/2004 |
| JP | 2004-297628 A | 10/2004 |
| JP | 2004-320762 A | 11/2004 |
| JP | 2004-356695 A | 12/2004 |

OTHER PUBLICATIONS

Japanese Office Action dated Oct. 4, 2007 with English translation (Five (5) pages).

* cited by examiner

*Primary Examiner*—Stella L Woo
(74) *Attorney, Agent, or Firm*—Crowell & Moring LLP

(57) ABSTRACT

Disclosed is a data transmission system to transmit digital data through a wireless transmission path, including: a first device including a communication condition detecting section, a data supplying section, a bit-rate converting section, a transmission buffer, a transmission communicating section and a channel switching section; and a second device including a reception communicating section, a reception buffer and a buffer storage amount detecting section, wherein the communication condition detecting section comprises a jamming detecting section, and when the jamming detecting section detects jamming, the bit-rate converting section lowers bit rate of the digital data to predetermined bit rate, and the channel switching section switches the communication channel to a channel where influence of the jamming is less, based on detection results by the buffer storage amount detecting section.

10 Claims, 4 Drawing Sheets

DATA TRANSMISSION SYSTEM

BACKGROUND OF THE INVENTION

1. Field of the Invention

The present invention relates to a data transmission system capable of transmitting video data with high bit rates through a wireless transmission path. More specifically, the present invention relates to a data transmission system capable of flexibly coping with a communication failure caused by jamming during data transmission.

2. Description of Related Art

In recent years, DVD/HDD recorders or personal computers with a PVR (Personal Video Recorder) function have been remarkably widespread. Accompanying this tendency, video properties capable of being privately viewed at home are also increasing. Further, it is desired to freely enjoy viewing at any required time or place the contents such as video information stored in DVD/HDD recorders or personal computers. Therefore, there is proposed a technology for enabling the contents to be outputted to client devices such as TV sets or personal computers using a home network. For a technology for transmitting vast quantities of data such as video data or audio data at high speed-in real time, for example, IEEE 1394 is adopted for an interface for connecting digital TV sets or digital videos.

Further, for simplifying the connection between devices, a wireless LAN has been recently used to allow connection of DVD/HDD recorders, personal computers or LCD monitors. For a typical technology using the wireless LAN, IEEE 802.11 standardized in IEEE is adopted, and a technology of using 2.4 GHz band becomes mainstream. The 2.4 GHz band is referred to as an ISM (Industrial, Scientific and Medical) band and is a frequency band used in an industrial, medical or household microwave oven. In Japan, a frequency band from 2.400 to 2.497 GHz is allocated to a wireless LAN.

When using the wireless LAN as a transmission path of digital AV data including video data or audio data, for example, a communication speed from 2 to 30 Mbps per channel is required for video data and a communication speed from 64 kbps to 1.5 Mbps is required for audio data. On the other hand, when using Internet, a communication speed of several Mbps is sufficient only in the case of Web access; however, a communication speed of several tens Mbps is required in the case of content delivery.

Further, there are problems that during the use of wireless LAN, an obstacle gets into a wireless transmission path or interference with communication between other devices occurs (jamming occurs), and as a result, a communication speed falls down or a communication failure occurs. Particularly, a 2.4 GHz frequency band includes much jamming because of being used by many wireless devices. Therefore, various technologies are proposed to solve the above-described problems.

For example, JP 2003-273879A proposes the following reception band management method. That is, when a total band decreases while plural terminals perform data reception, increase in a reception delay time is prevented in a terminal for receiving data (typically, video data for digital television broadcast, or video data or audio data for streaming reproduction) having a short permissible reception delay time, so that generation of reception failure due to the increase in the reception delay time (for example, a phenomenon such that in a digital television, a video frame is dropped or voice communication is interrupted) can be prevented.

JP 2004-266502A proposes the following video transmission system. That is, in a wireless net work in which the transmission band varies, even if the band greatly varies due to movement of a reception terminal, uninterrupted video transmission can be realized. Further, for a conventional technology for preventing video interruption due to band variations, there is disclosed a technology in which in response to a bit rate change request from a reception terminal, a server selects one video stream from among plural video streams with different bit rates to perform transmission.

JP 2004-297628A discloses the following technology. In this technology, characteristics of broadcast and communication are made full use of to establish new video content delivery configurations in which broadcast and communication are blended, and a video stream is delivered and reproduced while switching a first stream obtained through a broadcast wave and a second stream obtained through a communication line such as a network.

JP 2004-320762A discloses the following technology. In this technology, for example, a front end circuit which operates at 2.4 GHz and a front end circuit which operates at 5 GHz are provided in a wireless communication device to correspond to two frequency bands of 2.4 GHz band and 5 GHz band, respectively. By changing communication channels having these frequency bands, the number of channels capable of being simultaneously set within the same area in the wireless LAN system is greatly increased and the possibility of causing a communication link to be interrupted by jamming is reduced. Further, transmission conditions of video data and audio data are reported based on the communication conditions. Therefore, in switching the communication channels, even if display of videos is interrupted by the communication channel change, a user is prevented from feeling uncomfortable.

JP 2004-356695A discloses the following technology. In a receiving device which receives and decodes video data transmitted from a transmitting device, even if capacity of a buffer provided on the prestage of a decoder is reduced, the video data is reproduced without causing underflow or overflow as well as a delay time required to provide contents at the time of operating a remote controller is shortened.

JP 2002-198975A discloses the following communication quality maintenance and management method. That is, in a wireless LAN system, transmission channels are changed to reestablish a link while monitoring a link error.

On the other hand, for a technology for realizing streaming delivery of video data, there is studied a transcoding system in which in response to environments of a communication band of a user, a bit rate of the coded video data (e.g., MPEG 2-TS) is converted and then, data transmission is performed. When using this transcoding system, a flexible response to band variations is allowed in a transmission path with temporal band variations, so that the streaming delivery of high-quality video data can be realized. The above-described document discloses no technology for efficiently avoiding reduction in a communication speed or occurrence of a communication failure in the data transmission using the transcoding system.

SUMMARY OF THE INVENTION

It is one of objects of the present invention to provide a data transmission system capable of transmitting, using a wireless LAN, video data bit-rate converted by a transcoding system, so that a flexible response to temporal band variations can be allowed as well as a communication failure which may occur due to jamming can be avoided.

According to a first aspect of the invention, a data transmission system to transmit digital data through a wireless transmission path, comprises: a first device comprising a communication condition detecting section which detects communication condition of a network, a data supplying section which supplies digital data containing at least one of video data and audio data, a bit-rate converting section which converts bit rate of the digital data supplied by the data supplying section, a transmission buffer which stores the bit-rate converted digital data, a transmission communicating section which transmits and receives the digital data, and channel switching section which switches a communication channel; and a second device comprising a reception communicating section which transmits and receives digital data, a reception buffer which stores the received digital data, and a buffer storage amount detecting section which detects data storage amount in the reception buffer, wherein the communication condition detecting section comprises a jamming detecting section which detects jamming, and when the jamming detecting section detects jamming, the bit-rate converting section lowers bit rate of the digital data to predetermined bit rate, and the channel switching section switches the communication channel to a channel where influence of the jamming is less, based on detection results by the buffer storage amount detecting section.

That is, when jamming is detected, the transmission device switches the communication channel to a channel where interference of the jamming is less. The transmission device previously stores on the reception buffer digital data which is to be played on the output section while switching the channel (i.e. from switching the channel to establishing a link at a new channel). Therefore, bit rate of the digital data is configured to be lower than that in normal communication condition.

Preferably, the channel switching section switches the communication channels on the basis that the buffer storage amount detecting section determines that the predetermined bit-rate converted digital data is stored to bring the data storage amount in the reception buffer to an upper limit.

Preferably, the predetermined bit rate is determined based on the time required to switch the communication channel to newly establish a link and based on the capacity of the reception buffer.

Preferably, the communication condition detecting section includes a communication speed detecting section which detects communication speed in the communication channel, and the channel switching section switches the communication channel when the jamming detecting section detects jamming as well as the communication speed detecting section detects that a communication speed is below a predetermined value. That is, even if jamming is detected, the communication channel is kept as it is, when communication speed decreases a little and the communication condition does not get worse. The communication channel is switched, when communication speed decreases considerably so that communication condition gets worse.

According to a second aspect of the invention, a data transmission method, comprises the steps of: lowering bit rate of digital data to be transmitted to predetermined bit rate when jamming is detected; transmitting the bit-rate converted digital data; storing the digital data in a reception buffer; and switching a communication channel to a channel where an influence of jamming is less, based on data storage amount in the reception buffer.

According to a third aspect of the invention, a transmitting device, comprises: a communication condition detecting section which detects a communication condition; a data supplying section which supplies digital data at least one of containing video data and audio data; bit-rate converting section which converts bit rate of the digital data supplied by the data supplying section, transmission buffer which stores the bit-rate converted digital data; a transmission communicating section which transmits and receives the digital data; and a channel switching section which switches a communication channel, wherein the communication condition detecting section comprises a jamming detecting section which detects jamming, when the jamming detecting section detects jamming, the bit-rate converting section lowers bit rate of the digital data to predetermined bit rate, and the channel switching section switches the communication channel to a channel where influence of the jamming is less, based on the data storage amount in the reception buffer provided in a reception device.

According to the present invention, in the data transmission system capable of transmitting digital data through a wireless transmission path, when jamming is detected using the jamming detecting section, the bit-rate converting section converts a bit rate of the digital data into a predetermined bit rate and the channel switching section switches the communication channel to a channel where influence of the jamming is less, based on the data storage amount in the reception buffer. Further, digital data reproduced in the output section during performing the channel switching is previously stored in the reception buffer. Therefore, the communication channels can be dynamically switched without causing interruption of videos reproduced in the output section.

Further, when jamming is detected as well as the communication speed falls down below a predetermined value, the communication channels are switched. Specifically, only when detecting jamming strong enough to affect communication conditions, the communication channels are switched. Therefore, deterioration in communication quality caused by frequently switching the communication channels can be prevented.

BRIEF DESCRIPTION OF THE DRAWINGS

The present invention will become more fully understood from the detailed description given hereinbelow and the appended drawings which given by way of illustration only, and thus are not intended as a definition of the limits of the present invention, and wherein.

DETAILED DESCRIPTION OF THE INVENTION

Figure 1:
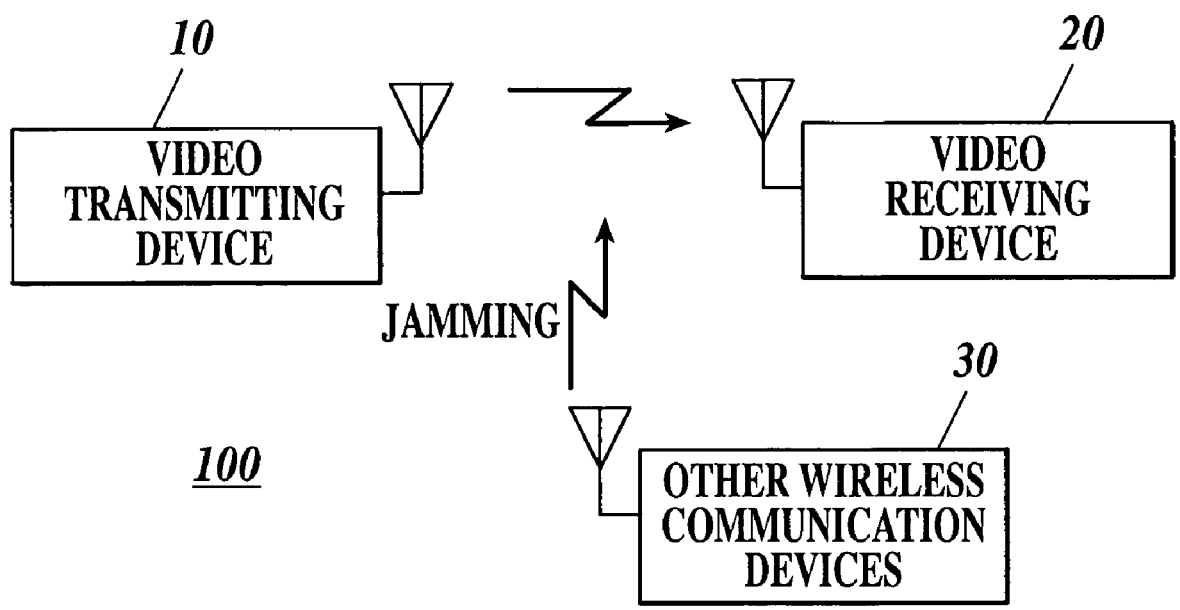
FIG. 1 is a schematic construction view of a data transmission system according to the present embodiment.

Preferred embodiments of the present invention will be described below by referring to drawings. FIG. 1 is a schematic construction view of a data transmission system of the present embodiment.

A data transmission system 100 according to the present embodiment is composed of a video transmitting device 10 which transmits digitized video data and a video receiving device 20 which receives the digital video data transmitted from the video transmitting device 10. The video transmitting device 10 and video receiving device 20 used herein perform data transmission, for example, in a 2.4 GHz band using a wireless LAN specified, for example, by IEEE 802.11g (communication speed: 54 Mbps).

Figure 2:
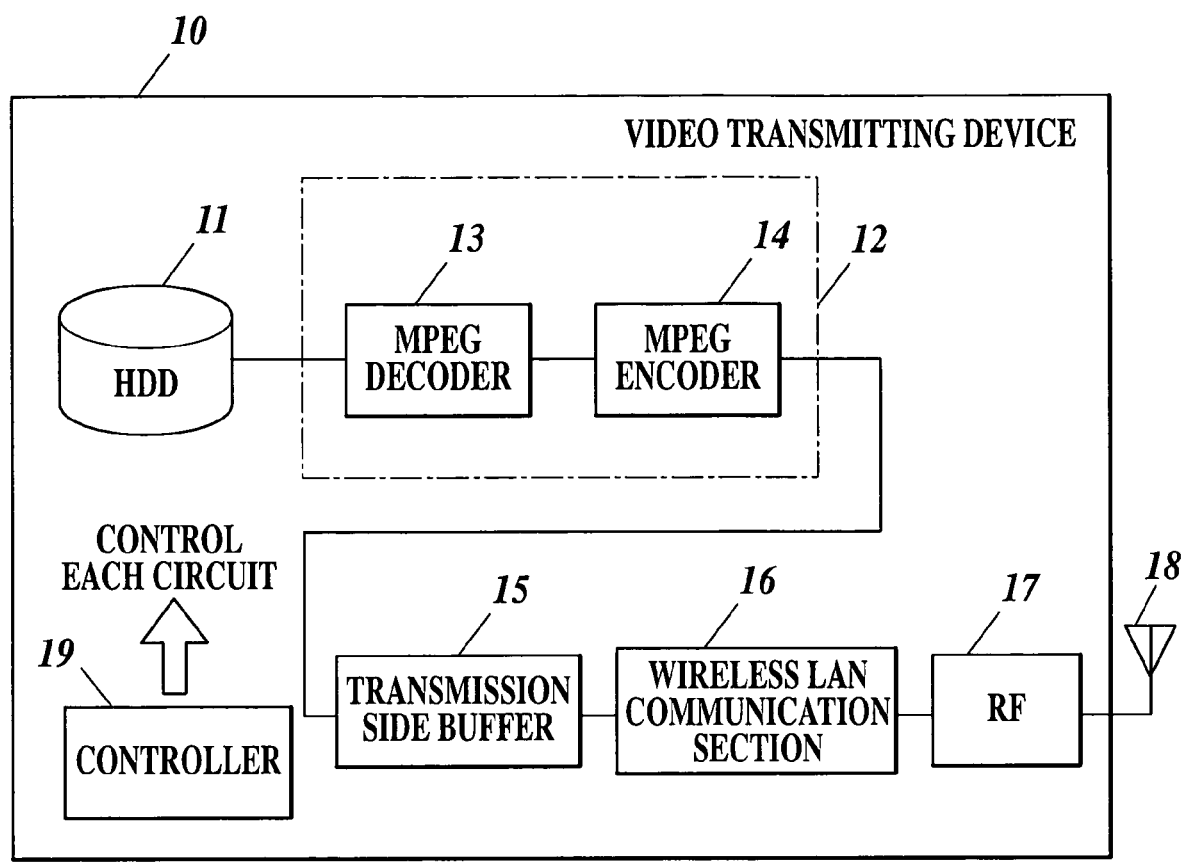
FIG. 2 is a schematic construction view of a transmitting device 20.

FIG. 2 is a schematic construction view of a data transmitting device 10. As shown in FIG. 2, the video transmitting device 10 has a hard disk 11 which stores digital video data, a transcoder 12 which converts a bit rate of the digital video data stored in the hard disk 11, a transmission buffer 15, a wireless LAN communicating section 16, a high-frequency amplifier (RF) 17, an antenna 18 and a transmission controller 19. The data transmitting device 10 which can be used herein is, for example, a DVD/HDD recorder or personal computer having a wireless communication function.

The hard disk 11 stores, for example, the digital video data compression-coded according to the MPEG 2 system.

The transcoder 12 has an MPEG decoder 13 and an MPEG encoder 14. In response to band variations of the communication channel, the transcoder 12 converts a bit rate of the digital video data supplied from the hard disk 11. Specifically, the transcoder 12 once performs, using the MPEG decoder 13, decoding of the digital video data supplied from the hard disk 11. Then, the transcoder 12 converts a bit rate of the decoded digital data into a bit rate suitable for a band of the communication channel to perform encoding again using the MPEG encoder 14. At this time, the bit rate control suitable for a band of the communication channel is performed based on an operation control from the after-described transmission controller 19.

For example, in a case where the bit rate of the digital video data stored in the hard disk 11 is 100 Mbps, when the data is transmitted using the wireless LAN (communication speed: 54 Mbps) based on the IEEE 802.11g, a defect occurs. Therefore, the bit rate must be converted into 54 Mbps or less. For example, the bit rate may be converted into 50 Mbps.

The transmission buffer 15 stores the digital video data bit-rate converted in the transcoder 12. The wireless LAN communicating section 16 performs protocol processing and modulation/demodulation processing on the digital video data outputted from the transmission buffer 15. The high frequency amplifier 17 amplifies a high-frequency component of a RF signal and transmits the amplified signal to the receiving device 20 through the antenna 18. For example, through the communication channel with a frequency band of which the center frequency is 2.412 GHz, the amplifier 17 transmits the RF signal.

The transmission controller 19 is composed of a CPU, RAM and ROM (not shown). The ROM stores various control programs, and the CPU operates according to the control programs within the ROM while using the RAM as a work area. For example, the transmission controller 19 monitors a change of the data storage amount in the transmission buffer 15 to thereby detect a communication speed (band variation) of the communication channel (communication speed detecting section). Further, the section 19 controls the transcoder 12 to convert a bit rate of the digital video data into a bit rate in response to the communication speed (band variation).

The section 19, when detecting as jamming a signal other than transmission signals (e.g., ACK) from the video receiving device 20 through the antenna 18 (jamming detecting section), performs switching control of the communication channel (channel switching section).

Figure 3:
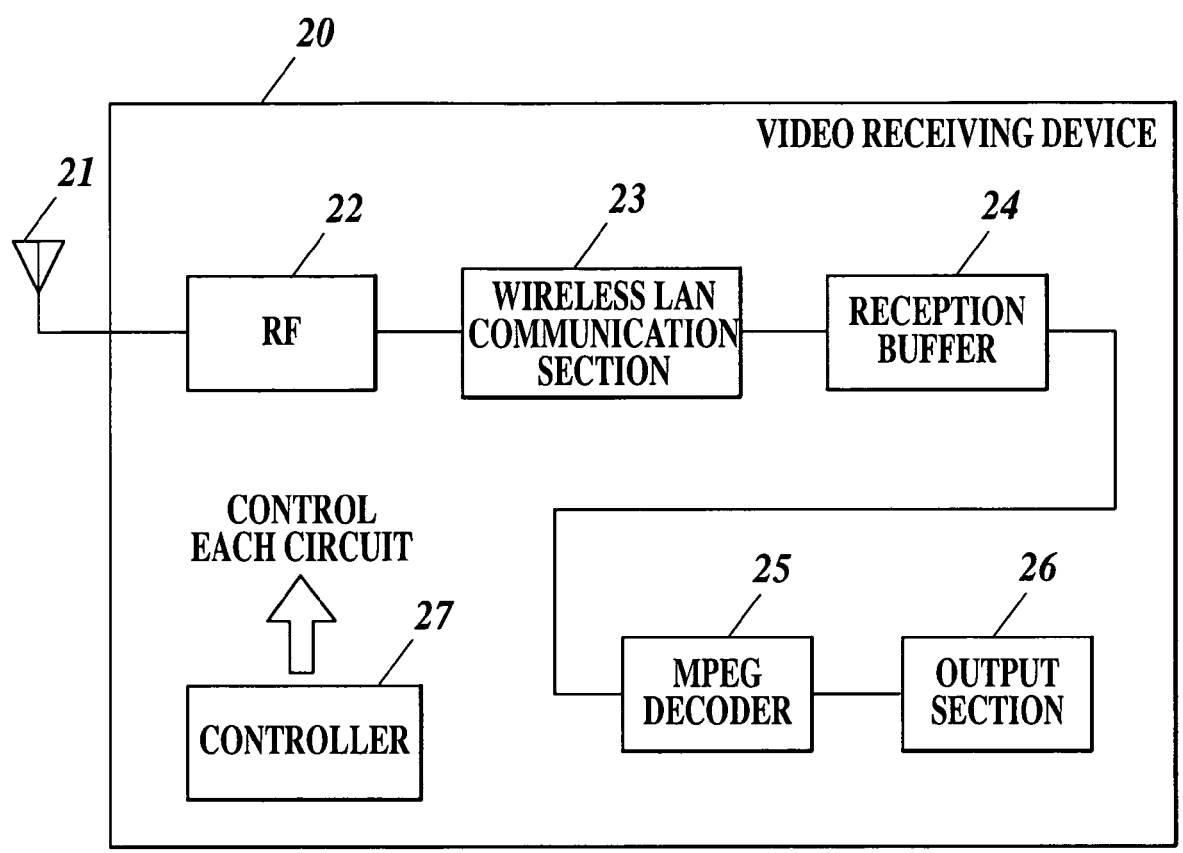
FIG. 3 is a schematic construction view of a receiving device 30.

FIG. 3 is a schematic construction view of the video receiving device 20. As shown in FIG. 3, the video receiving device 20 has an antenna 21, a high-frequency amplifier (RF) 22, a wireless LAN communicating section 23, a reception buffer 24, an MPEG decoder 25, an output section 26 and a reception controller 27. The device 20 receives the digital video data transmitted from the video transmitting device 10 and outputs the data. The video receiving device 20 which can be used herein is, for example, an LCD monitor having a wireless communication function.

The antenna 21 receives a RF signal transmitted through the communication channel from the video transmitting device 10 and supplies the received RF signal to the high-frequency amplifier 22. The high-frequency amplifier 22 amplifies a high frequency component of the RF signal received by the antenna 21 and supplies the amplified RF signal to the wireless LAN communicating section 23. The wireless LAN communicating section 23 performs protocol processing and modulation/demodulation processing on the digital video data supplied from the high-frequency amplifier 22. The reception buffer 24 sequentially stores the digital video data supplied from the wireless LAN communicating section 23.

The MPEG decoder 25 expansion-decodes the digital video data supplied from the reception buffer 24. The output section 26 outputs the digital video data supplied from the MPEG decoder 25.

The reception controller 27 is composed of a CPU, RAM and ROM (not shown). The ROM stores various control programs, and the CPU operates according to the control programs within the ROM while using the RAM as a work area. For example, the reception controller 27 monitors the data storage amount stored in the reception buffer 24 (buffer storage amount detecting section). Further, the controller 27 controls each circuit to allow the detected data storage amount to be transmitted to the video transmitting device 10.

In the above-described data transmission system, when communication is performed by a wireless communication device 30 other than the video transmitting device 10 and the video receiving device 20, radio interference occurs (jamming occurs), and as a result, a communication speed falls down or a communication failure occurs. Therefore, in the data transmission system 100 according to the present embodiment, occurrence of the communication failure due to the jamming is previously sensed and the communication channel between the video transmitting and receiving devices 10 and 20 is moved to a communication channel which is not affected by the jamming, whereby the digital video data is efficiently transmitted so as to be normally reproduced in the output section 26.

Figure 4:
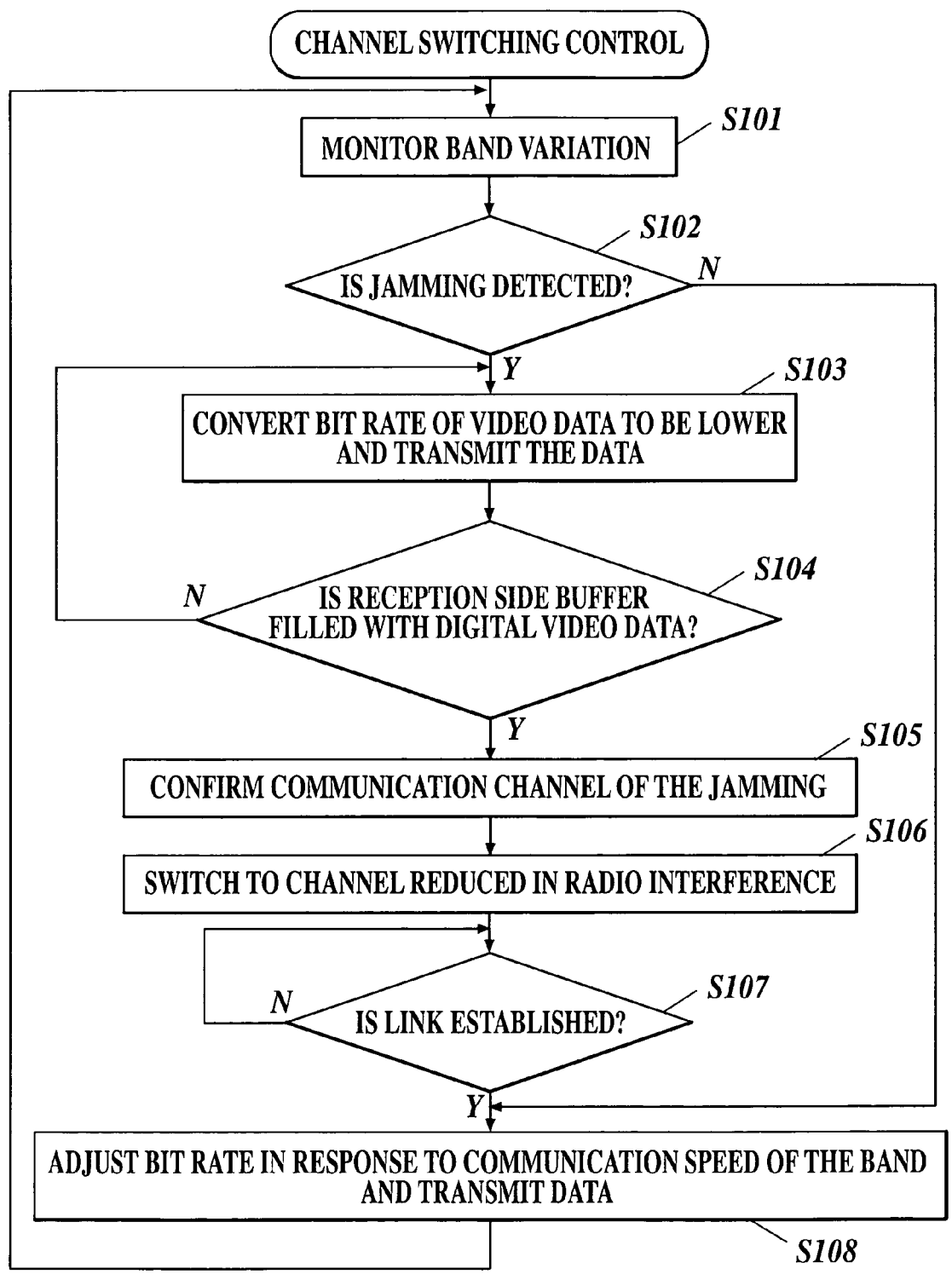
FIG. 4 is a flowchart showing a channel switching control process.

Specifically, the channel switching control process is performed according to a flowchart of FIG. 4. In the channel switching control process, the control programs are performed by the transmission controller 19 of the video transmitting device 10 and the respective circuits are controlled according to the control programs.

First, the transmission controller 19 detects the communication speed (band variation) of the communication channel based on the change of the data storage amount in the transmission buffer 15 (step S101). The detection of the communication speed is a process to be performed also during a normal data transmission. Based on the detection of the communication speed, a bit rate at the time of converting in the transcoder 12 a bit rate of the digital video data is determined. For example, in the case where the band of the communication channel is sufficiently idle, the bit rate is set to 50 Mbps.

Next, it is determined whether jamming is detected through the antenna 18 (step S102). When it is determined that no jamming is detected in step S102, the process moves to step S108. In step S108, a bit rate of the digital video data is converted in response to the communication speed in the communication channel and then, data transmission is performed.

On the other hand, when it is determined that the jamming is detected in step S102, a bit rate of the digital video data is converted into a low bit rate and then, data transmission is performed (step S103). Herein, it is desirable that the bit rate is determined based on the time required to switch the communication channels to newly establish a link and based on the capacity of the reception buffer. For example, the bit rate of the digital video data is converted into a bit rate of 5 Mbps and then, data transmission is performed. By thus determining the bit rate of the digital video data, the digital video data in an amount equal to the time required for the channel switching is stored in the reception buffer 24. Therefore, a video during the reproduction is prevented from being interrupted due to the channel switching.

Next, it is determined whether the reception buffer 24 is filled with the digital video data with a low bit rate (e.g., 5 Mbps) (step S104). Specifically, the reception controller 27 monitors the data storage amount in the reception buffer 24. When the buffer 24 is filled with the digital video data, a signal which indicates that effect is transmitted to the video transmitting device 10.

Further, when it is determined that the reception buffer 24 is filled with the digital video data with a low bit rate, the communication channel with jamming (center frequency of the jamming) is confirmed (step S105).

Next, the communication channel of the data transmission system is switched to a channel less in radio interference, that is, a channel prevented from overlapping the communication channel with jamming (step S106). Preferably, the communication channel of the system is switched to a communication channel having a frequency band which is farthest away from that of the communication channel with jamming.

Next, it is determined whether data transmission between the video transmitting device 10 and the video receiving device 20 is enabled through the switched communication channel to thereby establish a link (step S107). Further, the bit rate of the digital video data is adjusted in response to the communication speed in the newly established communication channel and then, data transmission is performed (step S108).

In normal data transmission, the digital video data having a high bit rate is transmitted and the digital video data stored in the reception buffer 24 is immediately reproduced. Therefore, the reception buffer 24 is rarely filled with the digital video data having a high bit rate. Further, the digital video data having a high bit rate, which is stored in the reception buffer 24, is extremely short in a reproduction time.

Therefore, in the present embodiment, in order to realize a longer reproduction time even in the same capacity, the digital video data having a bit rate lower than that during normal data transmission is transmitted to fill the reception buffer 24 and then, the digital video data having a low bit rate, which is stored in the reception buffer 24, is reproduced during switching the communication channels.

According to the data transmission system of the present embodiment, when a signal other than specific signals (signals from the video receiving device 20) is detected as jamming, a bit rate of the digital data for transmission is converted into a predetermined bit rate (low bit rate). Based on the data storage amount in the reception buffer 24, the communication channel is switched to a channel where influence of jamming is less. Further, the digital video data reproduced in the output section 26 in an amount equal to the time required for the channel switching is previously stored in the reception buffer 24. Therefore, the communication channels can be dynamically switched without causing interruption of videos reproduced in the output section 26. That is, when detecting jamming, the communication conditions may be so deteriorated that the digital video data cannot be normally transmitted. Therefore, before a harmful influence is exerted on transmission of the digital video data, the communication channels are switched to cope with the problem.

The invention performed by the present inventors is described in detail above with reference to the embodiment. The present invention is not limited to the above-described embodiment, and alterations can be made therein as appropriate without departing from spirit and scope of the inventions.

For example, when jamming is detected as well as the communication speed is lowered below a predetermined value, the communication channels may be switched. Specifically, only when detecting jamming strong enough to exert a harmful influence on the communication conditions of the network, the communication channels are switched. Therefore, deterioration in communication quality caused by frequently switching the communication channels can be prevented.

Further, in the above embodiment, the wireless LAN with a 2.4 GHz band specified by IEEE 802.11g is described. In addition thereto, other wireless transmission technologies can also be used. For example, a wireless LAN with a 5.2 GHz band stipulated by IEEE 802.11a, a wireless LAN with a 2.4 GHz band specified by IEEE 802.11b or an optical wireless LAN can be used.

Further, in the above embodiment, the hard disk 11 capable of storing the digital video data is provided in the video transmitting device 10. Further, a device (data supplying section) to supply the digital video data may be provided separately from the video transmitting device 10. Alternatively, the video receiving device 20 and the output device may be separately provided.

The entire disclosure of Japanese Patent Application No. 2005-087799 filed on Mar. 25, 2005, including description, claims, drawings and summary are incorporated herein by reference.

What is claimed is:

1. A data transmission system to transmit digital data through a wireless transmission path, comprising:
   a first device comprising:
      a communication condition detecting section which detects communication condition of a network,
      a data supplying section which supplies digital data containing at least one of video data and audio data,
      a bit-rate converting section which converts bit rate of the digital data supplied by the data supplying section,
      a transmission buffer which stores the bit-rate converted digital data,
      a transmission communicating section which transmits and receives the digital data, and
      a channel switching section which switches a communication channel; and
   a second device comprising:
      a reception communicating section which transmits and receives digital data,
      a reception buffer which stores the received digital data, and
      a buffer storage amount detecting section which detects data storage amount in the reception buffer,
   wherein the communication condition detecting section comprises a jamming detecting section which detects jamming and a communication speed detecting section which detects communication speed in a communication channel,
   when the jamming detecting section detects jamming as well as the communication speed detecting section detects that a band width of the communication channel is below a predetermined value, the bit-rate converting section converts bit rate of the digital data into bit rate determined based on the time required to switch the communication channel to newly establish a link and based on the capacity of the reception buffer, and the channel switching section, on the basis that the buffer storage amount detecting section determines that the predetermined bit-rate converted digital data is stored to bring the data storage amount in the reception buffer to an upper limit, switches the communication channel to a channel where influence of jamming is less.

2. A data transmission system to transmit digital data through a wireless transmission path, comprising:

a first device comprising:
 a communication condition detecting section which detects communication condition of a network,
 a data supplying section which supplies digital data containing at least one of video data and audio data,
 a bit-rate converting section which converts bit rate of the digital data supplied by the data supplying section,
 a transmission buffer which stores the bit-rate converted digital data,
 a transmission communicating section which transmits and receives the digital data, and
 a channel switching section which switches a communication channel; and a second device comprising:
 a reception communicating section which transmits and receives digital data,
 a reception buffer which stores the received digital data, and
 a buffer storage amount detecting section which detects data storage amount in the reception buffer, wherein the communication condition detecting section comprises a jamming detecting section which detects jamming, and when the jamming detecting section detects jamming, the bit-rate converting section lowers bit rate of the digital data to predetermined bit rate, and the channel switching section switches the communication channel to a channel where influence of the jamming is less, based on detection results by the buffer storage amount detecting section,.

wherein the predetermined bit rate is determined based on the time required to switch the communication channel to newly establish a link and based on the capacity of the reception buffer.

3. The data transmission system according to claim 2, wherein the channel switching section switches the communication channels on the basis that the buffer storage amount detecting section determines that the predetermined bit-rate converted digital data is stored to bring the data storage amount in the reception buffer to an upper limit.

4. The data transmission system according to claim 2, wherein the communication condition detecting section includes a communication speed detecting section which detects communication speed in the communication channel, and the channel switching section switches the communication channel when the jamming detecting section detects jamming as well as the communication speed detecting section detects that a communication speed is below a predetermined value.

5. A data transmission method, comprising the steps of:
 lowering bit rate of digital data to be transmitted to predetermined bit rate when jamming is detected;
 transmitting the bit-rate converted digital data;
 storing the digital data in a reception buffer; and
 switching a communication channel to a channel where an influence of jamming is less, based on data storage amount in the reception buffer,
 wherein the predetermined bit rate is determined based on the time required to switch the communication channel to newly establish a link and based on the capacity of the reception buffer.

6. The data transmission method according to claim 5, wherein the communication channel is switched when the predetermined bit-rate converted digital data is stored to bring the data storage amount in the reception buffer to an upper limit.

7. The data transmission method according to claim 5, wherein when jamming is detected as well as a communication speed in the communication channel is below a predetermined value, the communication channel is switched.

8. A transmitting device, comprising:
 a communication condition detecting section which detects a communication condition;
 a data supplying section which supplies digital data at least one of containing video data and audio data;
 a bit-rate converting section which converts bit rate of the digital data supplied by the data supplying section, a transmission buffer which stores the bit-rate converted digital data;
 a transmission communicating section which transmits and receives the digital data; and
 a channel switching section which switches a communication channel,
 wherein the communication condition detecting section comprises a jamming detecting section which detects jamming,
 when the jamming detecting section detects jamming, the bit-rate converting section lowers bit rate of the digital data to predetermined bit rate, and
 the channel switching section switches the communication channel to a channel where influence of the jamming is less, based on the data storage amount in the reception buffer provided in a reception device,
 wherein the predetermined bit rate is determined based on the time required to switch the communication channel to newly establish a link and based on the capacity of the reception buffer.

9. The transmitting device according to claim 8, wherein the channel switching section switches the communication channels on the basis that the buffer storage amount detecting section determines that the predetermined bit-rate converted digital data is stored to bring the data storage amount in the reception buffer to an upper limit.

10. The transmitting device according to claim 8,
 wherein the communication condition detecting section comprises communication speed detecting section which detects a communication speed in the communication channel,
 the channel switching section switches the communication channel when the jamming detecting section detects jamming as well as the communication speed detecting section detects that communication speed is below a predetermined value.

* * * * *